United States Patent [19]

Anazawa et al.

[11] Patent Number: 4,919,856
[45] Date of Patent: Apr. 24, 1990

[54] PROCESS FOR PRODUCING MEMBRANES FOR USE IN GAS SEPARATION

[75] Inventors: Takanori Anazawa, Sakura; Kazuo Hasumi, Odawara; Yoshiyuki Ono, Sakura, all of Japan

[73] Assignee: Dainippon Ink and Chemicals, Inc., Tokyo, Japan

[21] Appl. No.: 159,301

[22] Filed: Feb. 23, 1988

[51] Int. Cl.$^5$ .............................................. B29C 67/20
[52] U.S. Cl. ........................................ 264/22; 264/41; 264/46.1; 264/46.4; 264/129; 264/134; 264/135; 264/209.3; 264/211.13; 264/235; 264/235.6; 264/346; 427/172; 427/322; 427/421; 427/429; 427/434.2
[58] Field of Search ................. 264/41, 129, 134, 46.1, 264/22, 46.4, 135, 209.3, 211.13, 235, 235.6, 346; 427/172, 322, 421, 429, 434.2

[56] References Cited

U.S. PATENT DOCUMENTS

| | | | |
|---|---|---|---|
| 4,192,842 | 3/1980 | Kimura | 264/298 |
| 4,410,338 | 10/1983 | Yamamoto et al. | 55/158 |
| 4,440,643 | 4/1984 | Makino et al. | 210/500.2 |
| 4,664,681 | 5/1987 | Anazawa et al. | 55/158 |
| 4,704,238 | 11/1987 | Okuyama et al. | 264/41 |
| 4,734,196 | 3/1988 | Kono et al. | 210/500.36 |

FOREIGN PATENT DOCUMENTS

| | | |
|---|---|---|
| 0021422 | 1/1981 | European Pat. Off. . |
| 57-122906 | 7/1982 | Japan . |
| 59-59221 | 4/1984 | Japan . |

*Primary Examiner*—Hubert C. Lorin
*Attorney, Agent, or Firm*—Nixon & Vanderhye

[57] ABSTRACT

Method for producing a gas separation membrane comprising a microporous support having provided thereon a non-porous coating layer. The method comprises melt extruding a thermoplastic crystalline polymer under particular melt-extrusion conditions to form a precursor in the form of a hollow fiber or flat film, coating the precursor as a support with a coating substance composed of a natural or synthetic substance capable of forming a polymeric layer which does not form pinholes upon subsequent drawing after solidification to form a coating layer on the surface of the support, and solidifying the coating layer. The support is annealed either before or after the cooling process, and this is followed by cold drawing and heat setting the support to form the gas separation membrane.

87 Claims, 8 Drawing Sheets

PROCESS FOR PRODUCING MEMBRANES FOR USE IN GAS SEPARATION

BACKGROUND OF THE INVENTION

Recently, separation of mixed gases using membranes, i.e., membrane separation of gases has attracted much attention in many respects such as effects of saving energy and simplification of apparatus and process for the separation, and utilization thereof has been considered in a variety of fields of technology including production of oxygen- or nitrogen-rich air from the air, separation and recovery of $CO_2$, recovery of CO and $H_2$, removal of $NO_2$ and $SO_2$ from combustion waste gas, purification or adjustment of $H_2/CO$ known as synthesis gas in the so-called $C_1$-chemistry, separation and recovery of inert gases such as He from natural gas, and the like. The important features of the membrane which are decisive as to whether or not it can be practically used or whether or not it gains wide acceptance in these fields from economical viewpoint, for example, to include high gas separating ability, high gas flux, that is, high gas permeation rate of the permeate gas per unit surface area of the membrane, etc., and it is highly desired to develop membranes which are excellent in these characteristics.

This invention is contemplated to cope with the above-described requirements and provides a method for producing gas separation membranes which method is capable of having a high gas separating ability and a high gas flux as well as excellent mechanical properties.

PRIOR ART

As stated above, it is required in the field of gas membrane separation that membranes used for gas separation must have high gas separating ability and a high gas flux from the viewpoint of economy. In order to attain the object, it is indispensable to reduce the thickness of a material having gas separating ability so as to obtain thin membranes or films having a thickness of not larger than several micrometers ($\mu$m) so that practically acceptable gas flux, i.e., gas permeation rate of the permeate gas per unit surface area can be reached. However, such thin membranes or films have a very low mechanical strength such as self-supporting property and as a result they are used usually in the form of so-called composite membranes or films which are composed of an open-cellular porous membrane as a support and a nonporous ultra-thin film coated or otherwise formed thereon. The conventional methods for the production of such composite films include a liquid surface casting method as described, for example, in U.S. Pat. No. 4,192,842, a solution coating method as described, for example, in JP-A-57-122906, a plasma polymerization method as described, for example, in EP-A-21422, an interfacial polymerization method as described, for example, in JP-A-59-59221, and the like.

Also, examples of the conventional methods for the production of heterogeneous membranes which have a construction similar to that of the above-described composite membrane but comprises two layers of the same material, i.e., a porous layer and a non-porous layer, include a wet method as described, for example, in U.S. Pat. No. 4,440,643, a melt processing method as described, for example, in U.S. Pat. No. 4,664,681, and the like.

The solution coating method is a method in which a solution of a material having a gas separating ability is coated on a microporous membrane followed by drying to form a non-porous layer on the surface of the microporous membrane. The solution coating method has the following advantages over the conventional methods for the production of composite membranes or heterogeneous membranes.

(1) There is little or substantially no limitation on the materials to be used for forming microporous membrane serving as support and for providing coating substance, and the materials can be selected from a wide variety of substances, facilitating production of separation membranes in accordance with the objective;

(2) The conventional coating techniques can be used;

(3) High productivity is attained because of low costs for production installment and of high production speed;

(4) It is easy to produce hollow fiber type composite membrane of which the surface area is made large enough; and so on.

On the other hand, the coating method is disadvantageous in that reduction in the thickness of the coating layer with view to increasing the gas flux leads to incomplete coverage of open-cellular micropores in the support so that some of the micropores could remain as pinholes, resulting in the reduction in the gas separation coefficient of the resulting membrane. Therefore, the thickness of the coating layer must be large in order to obtain composite membranes with practically acceptable gas separation coefficient, with the result that only those membranes can be obtained which have a gas flux inferior to that of the membranes produced by other conventional methods for producing composite membranes.

An approach has been made in order to avoid difficulty in completely covering the pores in a microporous support by the coating method is described, for example, in JP-A-59-120211. According to the method, a self-supporting porous membrane is dipped with water or a solvent to form apparently nonporous construction which is then subjected to coating, followed by removing the dipped liquid.

However, the above-described approach is not practically acceptable for various reasons. Firstly, the conditions of the surface of the microporous support dipped with a liquid such as water or a solvent are unstable not only when a volatile liquid is used for dipping but also when the liquid for dipping is non-volatile, and therefore, it is considerably difficult to form a uniform, thin coating layer. In addition, the method needs a posttreatment for removing the dipped liquid; in the case where hollow fiber type supports are used this posttreatment operation is very difficult, which makes the method practically unacceptable.

Further, it is known, in the technology of producing coating films, to render the coating layer thinner by drawing the coating layer after its formation. However, the conventional method is also disadvantageous since it is only possible to obtain films whose coating layer has a thickness that is by "a reciprocal of the drawing ratio used" time as large as the original thickness of the coating layer.

SUMMARY OF THE INVENTION

As a result of intensive investigation on the method for producing composite membranes by a coating method, it has now been found that the difficulty in increasing the performance of the membrane involved in the coating method is due to necessity that the pores in the microporous support have to be covered completely by coating, and that ultra-thin membrane layer without pinholes can be formed by avoiding the essential difficulty, thus reaching this invention. The feature of this invention is to coat the support with a substance having gas separating ability prior to rendering the support microporous and then rendering only the support microporous.

That is, this invention is designed so as to maintain the support to be a nonporous material which has a smooth surface upon coating, and make only the support porous by drawing after the coating. Thus, the technical concept of this invention is based on one which is quite different from that of the conventional technology. As a result, this invention does not remain a mere thinning of the coating layer by drawing but enables elimination of the severe requirement that coverage or shut up of micropores must be done completely as encountered in the coating technique, thus enabling formation of ultra-thin coating layers.

In this invention, it is surprising that the base material can be made microporous by drawing without breakage of the coating layer provided on the support despite the occurrence of cleavage or cracks in the support upon drawing, with the coating layer remaining nonporous after the drawing without peeling-off from the support.

Thus, this invention provides a method for producing a gas separation membrane comprising a microporous support having provided thereon a coating layer, comprising:

(1) melt-extruding a thermoplastic crystalline polymer under the conditions of a melting temperature between Tm °C. and (Tm+100) °C. where Tm designates the crystalline melting point of the polymer and a draft ratio, Df, satisfying the relationship:

$$5 \leq Df \leq 10,000$$

to form a precursor in the form of a hollow fiber or flat film;

(2) coating said precursor as a support with a coating substance which does not form pinholes upon subsequent drawing process to form a coating layer on the surface of said support;

(3) annealing said support with said coating layer at a temperature between (Tg+20) °C. and (Tm−5) °C. where Tg indicates the glass transition temperature of said support and Tm has the same meaning as defined above,
  (a) after said coating process (2) above, or
  (b) prior to said coating process (2) above;

(4) drawing the thus-treated support with said coating layer at a temperature between (Tg−50) °C. and (Tm−10) °C. where Tg and Tm have the same meanings as defined above; and (5) heat-setting said support with said coating layer at a temperature between (The drawing temperature used in the step (4) above +10) °C. and Tm °C. where Tm has the same meaning as defined above to form micropores only in said support; thus forming a composite membrane comprising a microporous support having laminated thereon a nonporous coating layer.

DETAILED DESCRIPTION OF THE INVENTION

Figure 1:
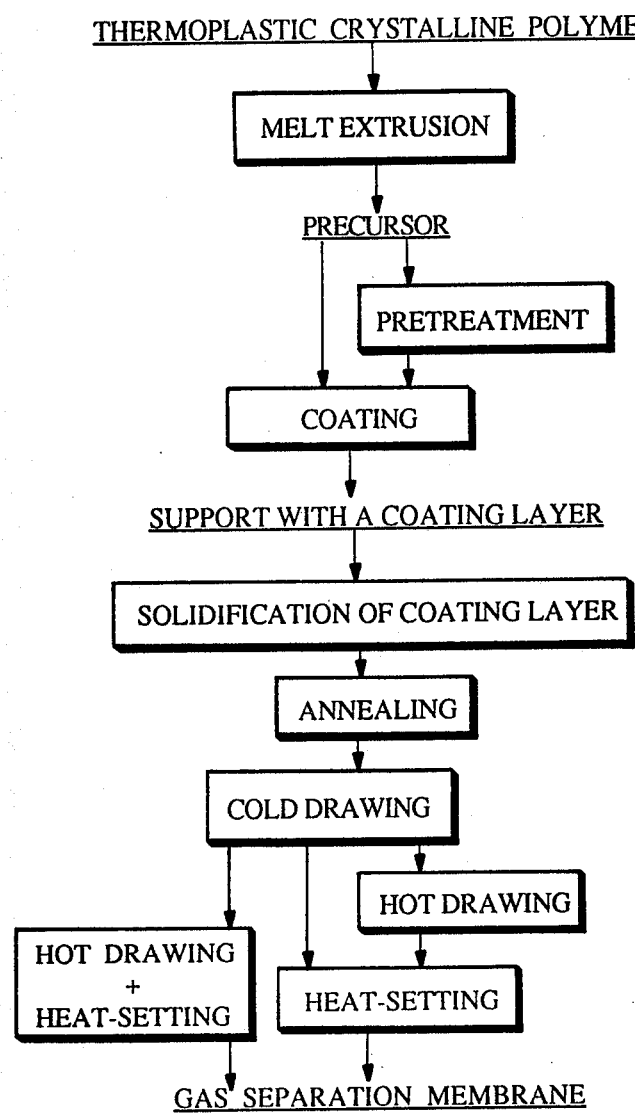
FIG. 1 is a flow diagram showing the method for producing a gas separation membrane according to the present invention in which the annealing is performed.

The present invention will be described in detail with reference to the attached drawings, in which FIG. 1 is a flow diagram showing a method for producing the gas separation membrane according to the present invention in which the annealing is performed.

The crystalline polymer which can be used in this invention is a thermoplastic crystalline polymer having an achievable crystallinity of not lower than 20%, examples of which include polyolefins such as polyethylene, polypropylene, poly-3-methylbutene-1 and poly-4-methylpentene-1, vinyl polymers such as polystyrene and polymethyl methacrylate, fluorine-containing polymers such as polyfluorovinylidene and fluorovinylethylene/tetrafluoroethylene copolymers, polyamides such as Nylon-6, Nylon-66 and Nylon-12, polyesters such as polyethylene terephthalate, polybutylene terephthalate and polyethylene 2,6-naphthalate, polycarbonates such as poly-4,4'-dioxydiphenyl 2,2-propane-carbonate, polyethers such as polyoxymethylene, polythioethers such as polymethylene sulfide, polyphenylene chalcogenides such as polyphenylene oxide, poly-2,6-dimethylphenylene oxide and polyphenylene sulfide, polyether ether ketones (PEEK) such as those having a recurring unit of:

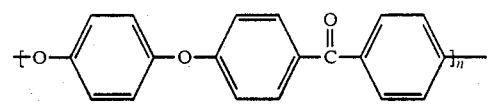

Also, blends and copolymers of one or more of the above-described polymers that have an achievable crystallinity of not lower than 20% may be used in this invention. Further, blends of the above-described crystalline polymers with other amorphous polymers or inorganic substances may also be used in this invention as far as the above-described crystalline polymers are contained in amounts of not lower than 70% based on the total weight of the resulting composition. The crystalline polymer used in this invention may contain antioxidants, anti-static agents, fungicides, lubricants, surfactants and the like additives in appropriate amounts, if desired.

The melt-spinning temperature of hollow fibers or melt-extrusion temperature of films, Tex, is higher than the melting temperature, Tm, of the polymer but preferably does not exceed the melting point by more than 100° C. Hereinafter, explanation will be made on hollow fiber membranes for brevity unless otherwise indicated. However, the same explanation will be applicable to extrusion or inflation of films. Preferred melt-spinning temperature varies depending upon the speed of crystallization of polymers, molecular weight of polymers, cooling conditions, spinning speed, draft ratio, and processing conditions in subsequent steps, and generally, when polymers having low crystallization speed or low molecular weight polymers are used, or when spinning speed is low or draft ratio is relatively small, low temperatures as low as (Tm+10) °C. to (Tm+50) °C. are preferred. It is difficult to obtain membranes with high gas flux at temperatures by at least 100° C. higher than the melting point, Tm.

The draft ratio (= drawing speed/discharge speed) is preferably 5 to 10,000. When the polymer used is a high molecular weight polymer having a melt viscosity of not lower than 7,000 poises at the spinning temperature, relatively low draft ratios of 5 to 200 are suitable, with draft ratio of not lower than 50 being generally preferred. In particular, when a low molecular weight polymer having a melt viscosity of not higher than 1,000 poises is used, it is necessary to use a high draft ratios as high as not lower than 500. Generally, when discharged fibers are quenched draft ratio may be lower than that used when they are annealed or cooled slowly. Although it is possible to produce the membrane of this invention with a draft ratio falling outside the range described above, there arise disadvantages when the draft ratios outside the range are used since not only high gas separating ability is unexpectable but also production of the fiber is difficult.

The speed of extrusion of the polymer can be selected rather unlimitedly depending on the requirements on apparatus conditions although there tends to occur breakage of filaments formed under too slow or too rapid extrusion speed conditions.

Various types of nozzles can be used for spinning hollow fibers. For example, torus type, horseshoe type, bridge type, etc. nozzles commonly used for spinning hollow fibers can be used in the method of this invention. Those dies which are used usually for producing films or sheets, for example, T dies and torusoid dies for inflation can be used in this invention.

The outer diameter of hollow fibers is selected so as to be in the range of 5 to 5,000 μm depending on the size of nozzle, draft ratio, etc. It is difficult to obtain membranes having a high gas flux when the diameter of hollow fibers is not larger than 5 μm or not smaller than 5,000 μm. The thickness of the membrane of the hollow fibers or films is preferably selected to be in the range of 1 to 1,000 μm. Outside this range, no acceptable microporous membrane can be produced and the gas flux thereof is low.

When the membranes produced in accordance with this invention is used as a gas separation membrane, hollow fibers are more advantageous than films because hollow fibers have larger surface area. Preferably, the outer diameter of the hollow fibers is 20 to 500 μm, and the thickness thereof is 1 to 50 μm.

The discharged fiber extruded from the nozzle is cooled and solidified. Although cooling can be carried out automatically by movement or running of the discharged fiber in the air, it is preferred to perform positive cooling operation. In this invention, usually employed cooling methods such as cooling using air blowing, chilled roll, water (hot water), etc. can be used. The cooling temperature is selected depending on the speed of crystallization of the polymer used, and generally, it is preferred to use a temperature in the range of (Tg−50) °C. to (Tm−50) °C.

Figure 2:
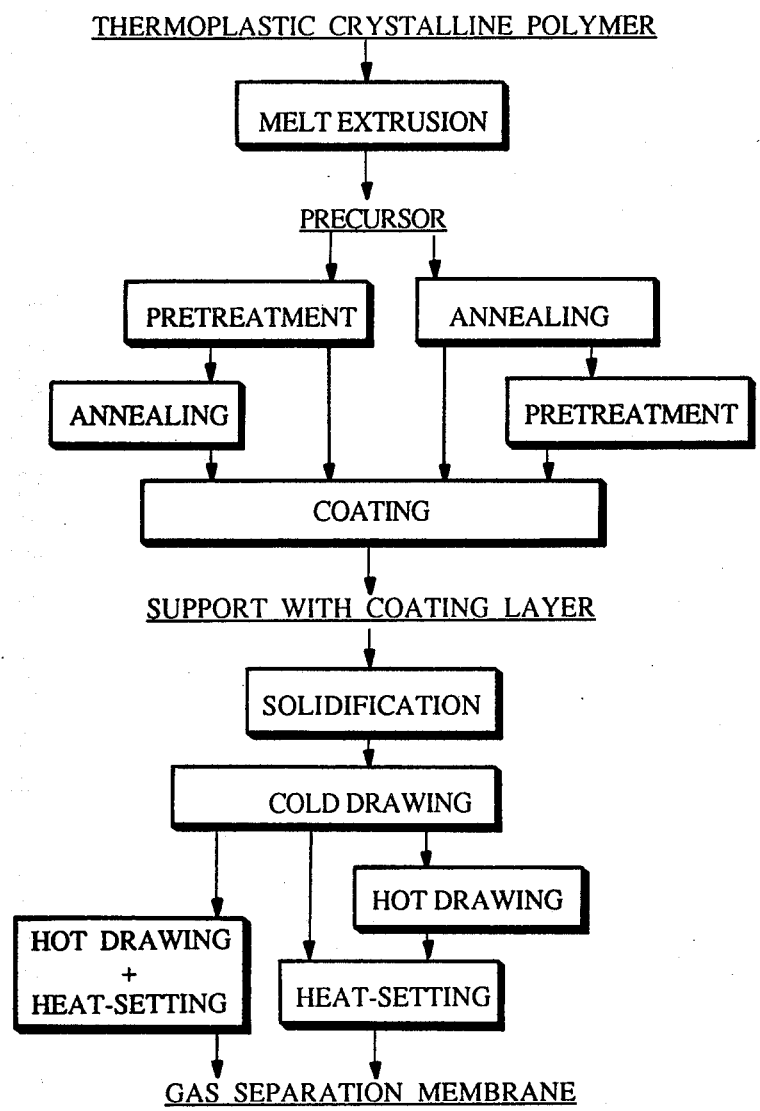
FIG. 2 is a flow diagram showing the method for producing a gas separation membrane according to the present invention in which the annealing is performed prior to coating.
Figure 3:
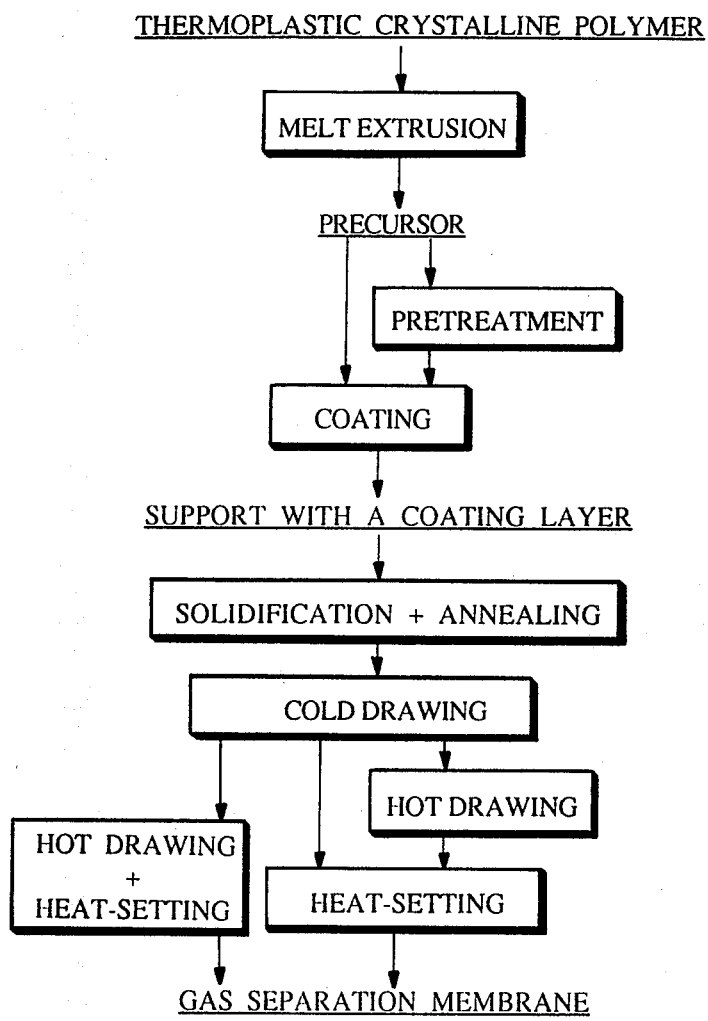
FIG. 3 is a flow diagram showing the method for producing a gas separation membrane according to the present invention in which the annealing is performed simultaneously with the solidification of the coating layer after the coating.

In this invention, the hollow fibers or films obtained according to the above-described method are coated with a coating substance. It is also possible to carry out heat treatment or annealing described hereinbelow prior to the coating as shown in FIG. 2.

The coating substance used in this invention includes all the substances capable of forming a polymeric layer by coating or by coating and one or more othere operations in combination, more particularly polymers capable of forming films after coating and drying, polymerizable monomers capable of forming films after coating by the action of heat, light, radiation, etc.

However, such coating substances should not be those which could form microporous open cells after solidification and subsequent drawing processes. In other words, the coating substances when formed into films must have high enough molecular weight so that sufficient strength is provided for avoiding the breakage of the film or Tg which is sufficiently lower than the drawing temperature. In addition, the coating substance when formed into films should not form micropores in the same mechanism as in the case of the support under the conditions for producing the composite membranes of this invention.

The coating substances which can be used in this invention may be natural substances or synthetic substances. Examples of the synthetic substance include addition polymers and condensation polymers. Typical examples of useful substances which can constitute the coating layers include substituted or unsubstituted polymers which are solid under the conditions under which gas separation is carried out. Specific examples thereof include synthetic rubber, natural rubber, relatively high molecular weight and/or high boiling point liquid, organic prepolymers, poly(siloxane) (silicone polymers), polysilazanes, polyurethanes, poly(epichlorohydrin)s, polyamines, polyimines, polyamides, acrylonitrile containing copolymers, polyesters (including polylactams), polyalkyl acrylates, and polyalkyl methacrylates, polysebacates, polysuccinates and alkyd resins, terpenoid resins, cellulose polymers, polysulfones, polyalkylene glycols and the like, polyalkylene polysulfates, polypyrrolidones, polyolefins such as polyethylenes, polypropylenes, polybutadienes, poly-2,3-dichlorobutadienes, polyisoprenes, polychloroprenes, polystyrenes and copolymers, polyvinyl alcohols, polyvinyl aldehydes (for example, polyvinyl formal and polyvinyl butyral), polyvinyl ketones (for example, polymethyl vinyl ketones), polyvinyl esters (for example, polyvinyl benzoates), polyvinyl halides (for example, polyvinyl bromides), polyvinylidene halides, polyvinylidene carbonates, poly-N-vinyl maleimides, polymethyl isopropenyl ketones, fluorinated ethylene copolymers, polyarylene oxides, polycarbonates, polyphosphates, and any desired copolymers containing the above-described block copolymers, grafts and blends. Upon coating, these polymers having been produced by polymerization beforehand may be used in the form of a solution, which is coated on hollow fibers or films, or alternatively, monomers or prepolymers, either as it is or in the form of a solution, are coated on hollow fibers or films followed by polymerization thereof. The coating substance may contain appropriate amounts of surfactants, anti-oxidants, anti-static agents, plasticizers, ultra-violet ray absorbents, coloring agents and the like in accordance with the purposes for which the composite membranes of this invention are used.

Further, it is effective to add a suitable amount of a high boiling point solvent or the like to a coating solution as an additive for preventing the occurrence of pinholes even when coating layers are thin.

It is preferred that the coating layer should not be so thick as to give adverse influences such as inappropriate reduction in gas flux on the performance of the composite membrane. The coating layer may have a mean thickness of about 0.001 to 50 μm. In some cases, the mean thickness of the coating layer can be not larger than 1 μm and in another cases not larger than 1 μm or further not larger than about 0.5 μm. The coating layer may be a single layer or may comprise at least two unit layers which may be composed of the same substance or different substances.

The coating layer may be applied to at least one surface of hollow fibers and films. Preferably only one surface of them is provided with the coating layer. Particularly, when the composite membrane of this invention is used as a separation membrane, it is preferred to apply the coating layer on the side on which a high pressure gas is brought into contact.

The coating operation can be performed by any appropriate methods such as spraying, coating using a brush or coating bar, dipping in a coating solution, and the like coating operations. As mentioned above, the coating substance is applied generally in the form of a solution, and it is preferred that it is used as a solution in a substantially non-solvent to the crystalline polymer when it is applied to hollow fibers or films.

The viscosity of the coating solution measured using a capillary viscosimeter is preferably 0.1 to 500 centipoises, more preferably 0.5 to 50 centipoises, at the coating temperature. When the coating solution is a solution of a polymer, it is preferred to adjust the concentration of the polymer so that the solution can have a viscosity in the above-described range. Suitable concentration of the polymer in the polymer solution varies widely depending on the degree of polymerization of the polymer used, and usually it is 0.01 to 10% by weight, preferably 0.05 to 2% by weight.

Then, the hollow fibers or films coated with the coating solution are allowed to form a solid coating layer by drying, polymerization, cross-linking or a like operation. Drying can be carried out by air-blowing, hot air, infrared radiation or a like suitable means. Polymerization or cross-linking can be carried out by heating, ultraviolet ray irradiation, visible light irradiation, contacting with a reactive gas or liquid, plasma treatment, etc.

Figure 4:
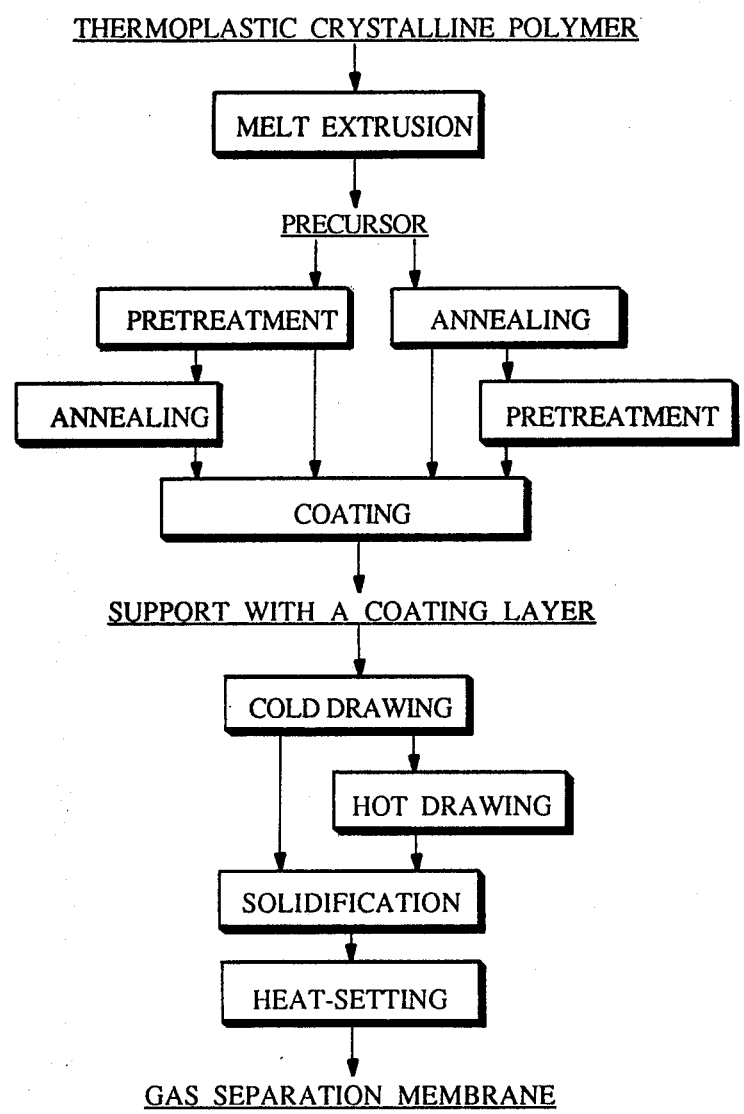
FIG. 4 is a flow diagram showing the method for producing a gas separation membrane according to the present invention in which the annealing is performed prior to the coating and the solidification of the coating layer is conducted after the cold drawing.
Figure 5:
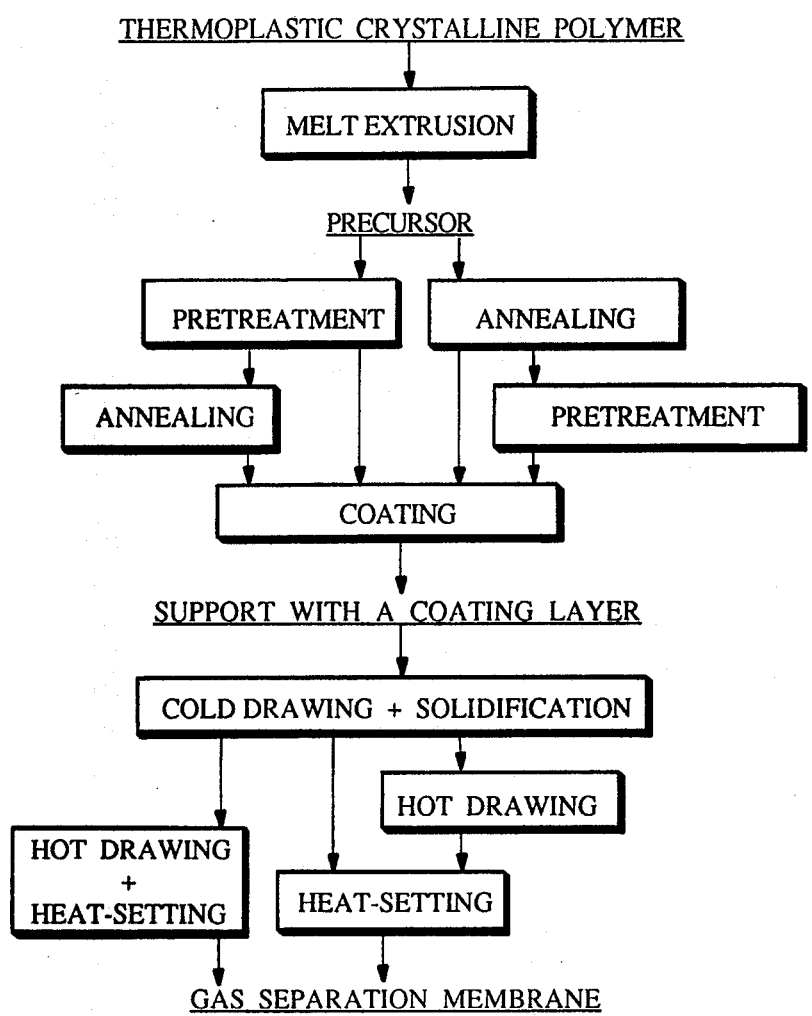
FIG. 5 is a flow diagram showing the method for producing a gas separation membrane according to the present invention in which the annealing is performed prior to the coating and the cold drawing is conducted simultaneously with the solidification of the coating layer.

When the coating operation is carried out prior to the heat treatment described hereinbelow, solidification of the coating layer by heating in this step may be omitted and instead, the heat treatment in the subsequent step may also be used for the solidification of the coating layer as shown in FIG. 4 or FIG. 5. On the other hand, when the coating operation is performed after the heat treatment described hereinbelow, the solidification of the coating layer may be delayed up until after or during the subsequent cold drawing. In any case, it should preferably be avoided that unsolidified coating layer be brought into contact with rolls because this greatly reduces separation coefficient of the resulting composite membrane.

Further, hollow fibers or film may be subjected to pretreatments such as corona discharge treatment, plasma treatment, treatment with an acid or alkali and coating with a surfactant, prior to the coating operation as shown in FIGS. 1 to 8. The pretreatment is particularly useful when the support used is a substance having a small surface energy such as polyolefins and fluorine-containing polymers. In order to prevent the occurrence of pinholes, coating operation may preferably be repeated a plurality of times. In this case, the same coating substance or different coating substances may be used.

Figure 6:
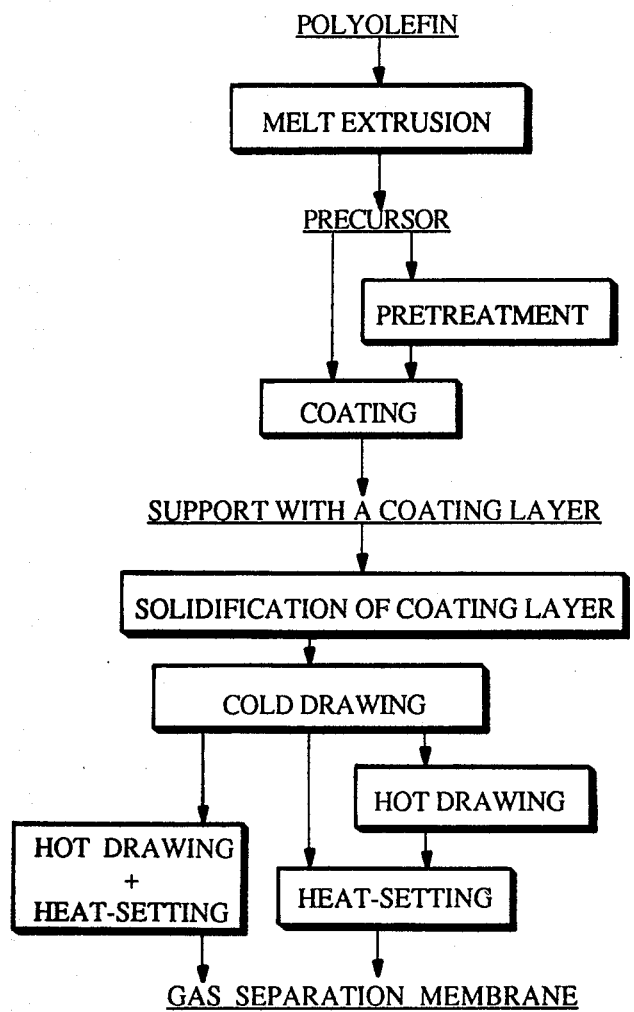
FIG. 6 is a flow diagram showing the method for producing a gas separation membrane according to the present invention in which the annealing is not performed.
Figure 7:
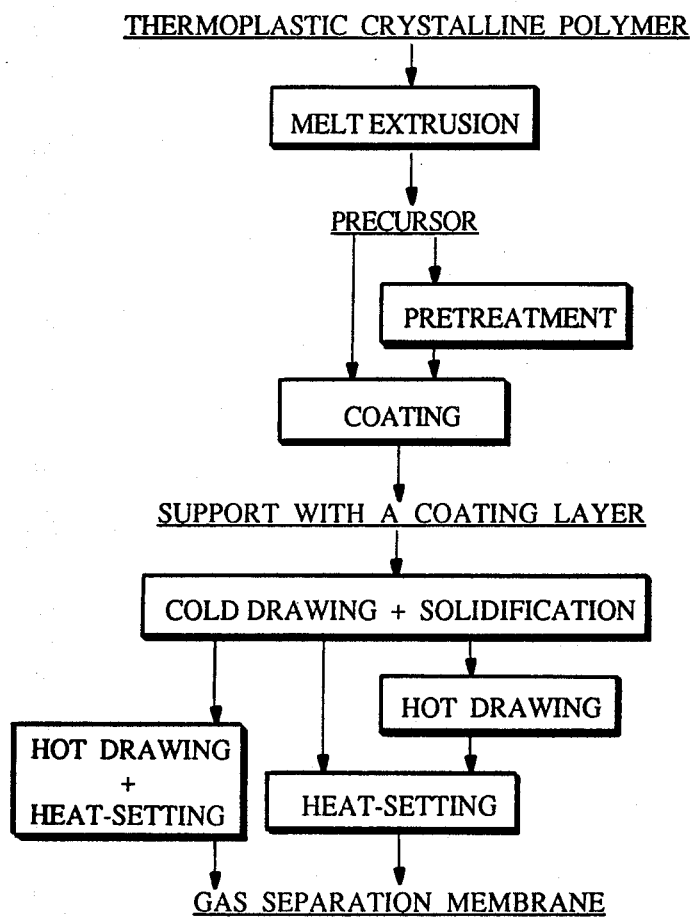
FIG. 7 is a flow diagram showing the method for producing a gas separation membrane according to the present invention in which the annealing is not performed, and the solidification of the coating layer is conducted simultaneously with the cold drawing.
Figure 8:
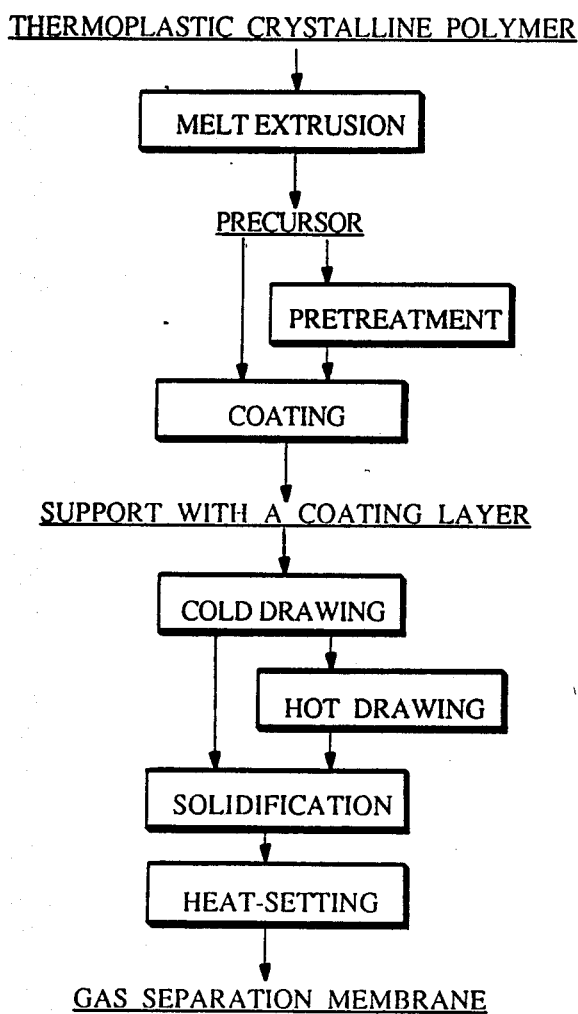
FIG. 8 is a flow diagram showing the method for producing a gas separation membrane according to the present invention in which the annealing is not performed, and the solidification of the coating layer is conducted after the cold drawing.

The hollow fibers thus-obtained are subjected to heat treatment or annealing. This heat treatment is not always necessary when the support used is composed of a polymer having a high degree of crystallization such as polyolefins because crystallization has already proceeded in the spinning step under slow cooling conditions (FIGS. 6 to 8). On the contrary, it is necessary to perform heat treatment when polymers whose crystallization speed is low such as polyesters are used as the support. Even when polyolefins and the like are used it is advantageous from the viewpoints of the performance of the resulting composite membrane and uniformity of the products to effect cooling in the spinning step and perform heat treatment in a separate step as shown in FIGS. 1 to 6. Suitable temperature of the heat treatment, TAN, is $(Tg+20)$ °C. to $(Tm-5)$ °C. The heating temperature outside this range is disadvantageous because membranes having a high gas flux cannot be obtained.

The thus-treated hollow fibers or films are then drawn to form void therein, thus forming micropores. This step is called a "cold drawing step". Suitable draw ratio (DR) is 1.05 to 3.0. Preferred temperature of the cold drawing, TCD, is $(Tg-50)$ to $(Tm-10)$ °C. In this temperature range, the lower the achievable degree of crystallization of the used or the lesser the extent of the growth of crystals after cooling and heat treatment, the lower the temperature at which the cold drawing should be carried out. Although there is some variation depending on the kind of the polymer used, generally, cold drawing must be carried out at a temperature of not higher then $(Tg+10)$ °C. when the degree of crystallization of the polymer is not higher than about 30%. Drawing at higher than that temperature results in the failure of forming voids in the support so that high gas flux cannot be achieved.

On the contrary, when polymers having a high crystallization speed and a high achievable degree of crystallization such as isotactic polypropylenes are used or the heat treatment is performed relatively sufficiently, it is preferred to draw the membrane at a temperature of not lower than Tg. Drawing at lower temperatures tends to cause breakage of the hollow fibers or films. Also, the drawing temperature is preferably not lower than Tg of the coating substance.

In order to further increase gas flux, it is preferred to draw the membrane at a temperature, THD, which is above the cold drawing temperature but not higher than Tm, subsequently to the cold drawing as shown in FIGS. 1 to 8 without relaxation of stress after the cold drawing. This second drawing step is called a "hot drawing step". The hot drawing may be performed in a single step or a plurality of steps. The total draw ratio of the cold drawing and hot drawing is preferably 1.1 to 5.0.

In the case of films, cold and hot drawings may be a free-size monoaxial drawing or a fixed-size monoaxial drawing. Alternatively, hollow fibers or films may be drawn continuously using rolls. Generally, drawing speed is 1 to 10,000%/sec. In continuous drawing, it is advantageous for obtaining products of uniform quality to fix the point of drawing or reduce the drawing area by reducing the section in which drawing takes place, using rolls having a small diameter, using a heating roll, etc.

Substantially no reduction in the cross section of the hollow fibers or films occurs after cold or hot drawing. This means that the apparent density decreases upon the treatment because of the occurrence of voids within the membrane, which makes the membrane microporous.

Heat setting of the membrane is performed so that the micropores formed in the support by cold and/or hot drawing can remain fixed after relaxation. The temperature of heat setting, THS, must be not lower than the cold drawing temperature +10° C. but not higher than Tm. Preferably, the heat setting is carried out for at least 1 second at draw of 0.9 to 2.0. The above-described hot drawing can be performed under the heat setting conditions as shown in FIGS. 1 to 3 and 5 to 7. When hot drawing is performed deterioration in the performance of the membrane will be least, if any, even if heat setting is effected without any restriction (under the condition of free contraction).

The shape of the membrane of this invention can be selected freely depending on the purpose for which it is used. For example, it can be molded in hollow fibers, tubular films, flat films, etc. In addition, various modifications such as introduction of reinforcing structure or member for increasing the strength of the membrane and variation in the thickness of the membrane can be made to the shape of the membrane of this invention, if desired.

The outer diameter of the hollow fibers including tubular films is preferably 5 to 5,000 $\mu$m, and more preferably 20 to 500 $\mu$m. Although it is possible to produce composite membranes in the form of hollow fiber having an outer diameter of not larger than 5 $\mu$m or not smaller than 5,000 $\mu$m, it is less merits to do so in view of production costs, performance of the membrane and other coefficients.

The thickness of the composite membrane is suitably 1 to 1,000 $\mu$m. With the thickness of not larger than 1 $\mu$m, it is difficult for the membrane to have a sufficient mechanical strength, while reduction in the gas flux occurs when the thickness of the membrane is not smaller than 1,000 $\mu$m. The same is true for flat films in this respect.

When it is intended to separate, concentrate or remove a desired gas from a gaseous mixture containing at least two gases by means of diaphragm separation method, it is generally required that the separation apparatus have a suitable gas selectivity, good concentration ratio, high gas flux and the like characteristics, which are mostly dependent on the performance of the separation membrane. The composite membrane of this invention has an excellent performance as a gas separation membrane.

Examples of gas separation systems in which the composite membrane of this invention can be used include production of oxygen-rich air or nitrogen-rich air from the air, separation and recovery of $CO_2$, recovery of CO or $H_2$ from combustion exhaust gas, removal of $NO_2$ or $SO_2$ from exhaust gas, separation of $CO/O_2$, separation of $H_2/CO$, separation of $H_2/O_2$, separation and recovery of inert gases such as He and the like, separation of methane/ethane, etc. However, this invention is not limited thereto.

The composite membrane of this invention can also be used in various operations such as separation and concentration which can be achieved by means of permeation through non-microporous thin membranes, for example, selective or non-selective removal of gases dissolved in a liquid such as degasing of water in or for boilers, selective or non-selective dissolution of gases in a liquid as exemplified by artificial lung, incubator, etc., separation of a desired liquid from a mixed liquid (so-called partial vaporation) and the like.

EXAMPLES

This invention will be described in greater detail with reference to the following examples. However, this invention should not be construed as being limited thereto.

EXAMPLE 1

Polypropylene having a density of 0.91 g/cm$^3$ (melt index according to ASTM D-1238: 3.0; Tg= −25° C.; Tm=190° C.) was spun from a nozzle of 9 mm in diameter at 230° C. at a take-up speed of 250 m/min and a draw ratio of 500 to obtain hollow fibers having an outer diameter of 214 $\mu$m and a thickness of 20.5 $\mu$m. The non-drawn hollow fibers were subjected to heat treatment at 140° C. for 30 minutes under constant length conditions. Electron microscopic observation using a scanning electron microscope (SEM) having a resolution of about 100 Angstroms of the outer and inner surfaces of the hollow fibers cut obliquely indicated that the fibers contained no micropores therein either on the outer surface or on the inner surfaces thereof. The non-microporous hollow fibers were then dipped continuously using a series of rolls in a 0.5 wt. % solution of a polyethylene having a weight average molecular weight of 320,000 in toluene, and dried with hot air at 100° C. After this coating operation was repeated three times, the resulting composite hollow fibers were continuously drawn using a series of rolls at 105° C. and at a draw ratio of 2.0. Then, the hollow fibers were introduced continuously in an incubator in which hot air at 140° C. is circulated, while keeping the fibers under drawing conditions, with retention time in the incubator being 1 minute to effect heat setting of the composite fibers. Observation of the thus-obtained hollow fibers using an SEM in the same manner as above indicated that there were on the inner surface micropores having a longer diameter of 0.5 $\mu$m and a shorter diameter of 0.2 μm while no micropores were found on the outer surface. The gas flux and separation coefficient of the hollow fibers thus-obtained for oxygen and nitrogen were measured. The measurement was performed by pressurizing the hollow fibers from outside at a pressure of 1 kg/cm$^2$ and measuring the rate of increase in the inner pressure of the hollow fiber which was initially set at a pressure of at most 0.1 torr. The surface area of the hollow fiber was determined from an electron micrograph of the cross-section of the hollow fiber. As the result, oxygen permeaion rate $Q(O_2)=9.1\times10^{-6}$ (cm$^3$(STP)/cm$^2$·sec·cmHg), and oxygen/nitrogen separation coefficient $\alpha=O_2/N_2=5.9$.

COMPARATIVE EXAMPLES 1

Hollow fiber membranes were produced in the same manner as in Example 1 except that the coating of polystyrene was performed after the heat setting instead performing after the heat treatment. SEM observation of the hollow fibers before the coating (after the heat setting) revealed that micropores having a longer diameter of about 0.5 μm and a shorter diameter of about 0.1 μm were found on both the inner and outer surfaces of the hollow fiber. Gas permeation tests were conducted in the same manner as in Example 1 and the results obtained are shown in Table 1 below. From the results, it can be seen that the gas flux was decreased to one tenth or less as large as that of the hollow fiber produced in Example 1.

TABLE 1

| Run No. | Concentration of Polystyrene (wt. %) | $O_2/N_2$ Separation Coefficient | $O_2$ Gas Flux (*) |
|---|---|---|---|
| 1 | 0.5 | 0.94 | $2.4\times10^{-3}$ |
| 2 | 0.7 | 0.94 | $2.8\times10^{-4}$ |
| 3 | 1.0 | 1.1 | $1.1\times10^{-5}$ |
| 4 | 1.5 | 5.0 | $1.9\times10^{-6}$ |
| 5 | 2.5 | 5.9 | $7.7\times10^{-7}$ |

*cm$^3$ (STP)/cm$^2$ · sec · cmHg

EXAMPLE 2

The same polypropylene as used in Example 1 was spun from a torusoid nozzle of 5 mm in diameter at 240° C. at a take-up speed of 800 m/min and a draft ratio of 1,000 and the resulting hollow fibers were continuously introduced in a hot-blast stove at 145° C. at a draw ratio of 1.0 (constant length) with a retention time of 30 seconds to effect the heat treatment. The non-microporous hollow fibers were then dipped continuously using a series of rolls in a 0.8 wt. % solution (45° C.) of a poly-4-methylpentene-1 (melt index according to ASTM D-1238: 26; Tb=25° C.; Tm=235° C.) in cyclohexene, and dried with hot air at 80° C. After this coating operation was repeated three times, the resulting hollow fibers were cold drawn using a series of rolls at 35° C. and at a draw ratio of 1.2. Subsequently, the hollow fibers were hot drawn at 140° C. at a draw ratio of 1.5, and then heat set at 145° C. at a draw ratio of 1.0 for 10 seconds. The gas permeation characteristics of the hollow fibers thus-obtained was measured, and the results obtained are shown in Table 2 below.

TABLE 2

| Run No. | Gas | $O_2$ Gas Flux (*) | Q/Q($N_2$) Separation Coefficient |
|---|---|---|---|
| 1 | $N_2$ | $1.7\times10^{-5}$ | 1.0 |
| 2 | Ar | $2.0\times10^{-5}$ | 1.1 |
| 3 | CO | $3.1\times10^{-5}$ | 1.8 |
| 4 | $O_2$ | $6.5\times10^{-5}$ | 3.7 |
| 5 | He | $2.3\times10^{-4}$ | 13.1 |
| 6 | $CO_2$ | $3.4\times10^{-4}$ | 19.6 |
| 7 | $H_2$ | $4.1\times10^{-4}$ | 23.4 |

*cm$^3$ (STP)/cm$^2$ · sec · cmHg

COMPARATIVE EXAMPLE 2

Hollow fiber membranes were produced in the same manner as in Example 1 except that the coating of poly-4-methylpentene-1 was performed after the heat setting instead of performing after the heat treatment. SEM observation of the hollow fibers before the coating (after the heat setting) revealed that micropores having a longer diameter of about 0.4 μm and a shorter diameter of about 0.1 μm were found on both the inner and outer surfaces of the hollow fiber. Gas permeation tests were conducted in the same manner as in Example 1 and the results obtained are shown in Table 3 below. From the results, it can be seen that when the hollow fibers are coated many times of coating operations are necessary for completely cover or block the micropores, and that smaller number of coating operations leads to lower gas flux.

TABLE 3

| Run No. | Number of Coating | $O_2/N_2$ Separation Coefficient | $O_2$ Gas Flux (*) |
|---|---|---|---|
| 1 | 3 | 0.94 | $7.7\times10^{-3}$ |
| 2 | 5 | 0.94 | $2.1\times10^{-4}$ |
| 3 | 7 | 1.0 | $4.8\times10^{-5}$ |
| 4 | 10 | 3.7 | $6.0\times10^{-6}$ |
| Ex. 2 | 3 | 3.7 | $6.5\times10^{-5}$ |

*cm$^3$ (STP)/cm$^2$ · sec · cmHg

COMPARATIVE EXAMPLE 3

SEM observation of commercially available polypropylene porous hollow fiber ("DURAGUARD 6112" manufactured by Polyplastics Co., Ltd.) revealed that the fiber had micropores having a longer diameter of about 0.5 μm and a shorter diameter of about 0.1 μm on both the outer and inner surfaces of the fiber. The fibers were coated in the same manner as in Example 2 to obtain composite hollow fibers, which were then tested for gas flux. The results obtained are shown in Table 4 below.

TABLE 4

| Run No. | Number of Coating | $O_2/N_2$ Separation Coefficient | $O_2$ Gas Flux (*) |
|---|---|---|---|
| 1 | 3 | 0.94 | $8.2\times10^{-3}$ |
| 2 | 5 | 0.94 | $4.8\times10^{-3}$ |
| 3 | 7 | 0.94 | $3.1\times10^{-4}$ |
| 4 | 10 | 0.96 | $7.6\times10^{-5}$ |
| 5 | 15 | 3.7 | $5.5\times10^{-6}$ |

*cm$^3$ (STP)/cm$^2$ · sec · cmHg

EXAMPLE 3

Poly-4-methylpentene-1 (melt index according to ASTM D-1238: 26; Tg=25° C.; Tm=235° C.) was spun from a nozzle of 5 mm in diameter at 300° C. at a take-up speed of 400 m/min and a draft ratio of 2,000. After subjecting the resulting hollow fibers to corona discharging they were coated with a 15 wt. % solution of poly(dimethylsiloxane) in toluene and dried with hot air at 50° C. This coating operation was repeated 3 times and the resulting composite hollow fibers were heat treated at 190° C. for 30 minutes. Then, the fibers were drawn continuously using a series of rolls at room temperature at a draw ratio of 1.3, and subsequently drawn at 150° C. at a draw ratio of 1.3, followed by heat setting at 180° C. under constant length conditions. The gas flux of the hollow fibers thus-obtained for oxygen and nitrogen was measured, and the results obtained are:

$Q(O_2) = 2.1 \times 10^{-4}$ (cm$^3$(STP)/cm$^2$·sec·cmHg)

$\alpha(O_2/N_2) = 2.1$

EXAMPLE 4

Poly-4-methylpentene-1 (melt index according to ASTM D-1238: 26; Tg=25° C.; Tm=235° C.) was spun from a nozzle of 5 mm in diameter at 280° C. at a take-up speed of 100 m/min and a draft ratio of 400, followed by heating at 200° C. for 1 minutes. Immediately after dipping the hollow fibers continuously using a series of rolls in a solution consisting of 0.5 wt. % poly-4-methylpentene-1, 0.5 wt. % decaline and 99 wt. % of cyclohexene, the fibers were dried with hot air at 50° C. Then, the fibers were drawn at a ratio of 1.3 at 35° C., and subsequently drawn at 150° C. at a draw ratio of 1.2, followed by heat setting at 190° C. at a draw ratio of 0.95. The gas flux of the hollow fibers thus-obtained for oxygen and nitrogen was measured, and the results obtained are:

$Q(O_2) = 7.2 \times 10^{-5}$ (cm$^3$(STP)/cm$^2$·sec·cmHg)

$Q(N_2) = 2.0 \times 10^{-5}$ (cm$^3$(STP)/cm$^2$·sec·cmHg)

$\alpha(O_2/N_2) = 3.6$

EXAMPLE 5

A high density polyethylene (melt index according to ASTM D-1238; Tg=−120° to +20° C.; Tm=136° C.) was spun from a torusoid nozzle of 9 mm in diameter at 150° C. at a take-up speed of 900 m/min and a draft ratio of 2,000 to obtain hollow fibers. Then, the hollow fibers were subjected to heat treatment at 110° C. for 1 minutes using a series of rolls. After they were continuously dipped in a 2 wt. % solution in chloroform of a polysiloxane derivatives represented by the following formula

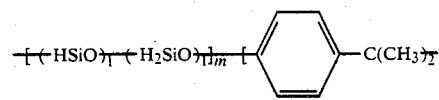

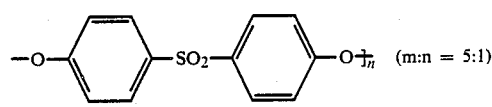

the hollow fibers were dried with hot air at 60° C., drawn at room temperature at a draw ratio of 1.3 and then at 100° C. at a draw ratio of 1.6, followed by heat setting at 110° C. for 10 seconds under constant length conditions. The gas flux of the hollow fibers thus-obtained was measured, and the results obtained are:

$Q(O_2) = 1.0 \times 10^{-4}$ (cm$^3$(STP)/cm$^2$·sec·cmHg)

$\alpha(O_2/N_2) = 2.3$

EXAMPLE 6

Hollow fibers were produced in the same manner as in Example 1 except that a 0.5 wt. % solution of a polyvinyl acetate in methyl ethyl ketone was used as a coating agent. The characteristics of the membrane thus-obtained were measured, and the results obtained are:

$Q(O_2) = 2.8 \times 10^{-6}$ (cm$^3$(STP)/cm$^2$·sec·cmHg)

$\alpha(O_2/N_2) = 6.6$

EXAMPLE 7

Polyoxymethylene (melt index according to ASTM D-1238: 9 (190° C.) Tg=−50° C.; Tm=179° C.) was spun from a torusoid nozzle of 6 mm in diameter at 200° C. at a take-up speed of 500 m/min and a draft ratio of 250, with cooling with air at 25° C. to obtain hollow fibers. The hollow fibers were subjected to a series of treatments sequentially as described below.

(1) corona discharging at an intensity of 1.25 w-sec/cm$^2$, 2 times;

(2) dipping in a 0.3 wt. % solution in chloroform of poly-(methyl methacrylate), 2 times, and drying at 140° C. which also serves as heat treatment, 2 times;

(3) drawing at 70° C. and at a draw ratio of 1.6; and (4) heat setting at 130° C. and at a draw ratio of 1.0, with retention time being 1 minute.

The gas flux of the hollow fibers thus-obtained for oxygen and nitrogen was measured, and the results obtained are:

$Q(O_2) = 2.7 \times 10^{-6}$ (cm$^3$(STP)/cm$^2$·sec·cmHg)

$Q(N_2) = 4.3 \times 10^{-7}$ (cm$^3$(STP)/cm$^2$·sec·cmHg)

$\alpha(O_2/N_2) = 6.3$

EXAMPLE 8

Poly(p-phenylene sulfide) (melt index according to ASTM D-1238: 20 (316° C.); Tg=93° C.; Tm=280° C.) was spun from a torusoid nozzle of 6 mm in diameter at 320° C. at a take-up speed of 200 m/min and a draft ratio of 500, with cooling with air at 120° C. to obtain hollow fibers, which were continuously passed through a hot-blast stove at 270° C. using a series of rolls to anneal them for 30 minutes. The thus-treated hollow fibers were then coated with a solution consisting of 1.0 wt. % poly(2,6-dimethyl-p-phenylene oxide), 0.5 wt. % 2,6-xylenol and 98.5 wt. % chloroform by spraying, followed by drying with hot air at 150° C. Then, the fibers were drawn at a ratio of 1.2 at 100° C., and subsequently drawn at 170° C. at a draw ratio of 1.3, followed by heat setting at 250° C. at a draw ratio of 1.0 for 1 second. The gas flux of the hollow fibers thus-obtained for oxygen and nitrogen was measured, and the results obtained are:

$Q(O_2) = 4.4 \times 10^{-5}$ (cm$^3$(STP)/cm$^2$·sec·cmHg)

$Q(N_2) = 1.3 \times 10^{-5}$ (cm$^3$(STP)/cm$^2$·sec·cmHg)

$\alpha(O_2/N_2) = 3.4$

From the oxygen permeation coefficient $P(O_2) = 1.3 \times 10^{-9}$ (cm$^3$·cm/cm$^2$·sec·cmHg), the thickness of the coating layer was calculated to be 0.3 μm (without correction of the opening ratio of the support).

EXAMPLE 9

Poly(ether ether ketone) (melt viscosity at 400° C., 1,000 sec$^{-1}$: 5,000 poises; Tg=143° C.; Tm=334° C.) was spun from a torusoid nozzle of 4 mm in diameter at 360° C. at a take-up speed of 100 m/min and a draft ratio of 200, with cooling with air at 150° C. to obtain hollow fibers, which were continuously passed through a far-infrared stove with a hot plate at 330° C. using a series of rolls to anneal them for 15 minutes. The thus-treated hollow fibers were then dipped in a 0.5 wt. % solution of polysulfone ("P 3,500" manufactured by Union Carbide Co.) in dichloroethane by spraying, followed by drying with hot air at 150° C. Then, the fibers were dried with hot air at 120° C. This procedure was repeated twice. The thus-treated hollow fibers were drawn at a ratio of 1.3 at 70° C., and subsequently drawn at 170° C. at a draw ratio of 1.3, followed by heat setting at 300° C. at a draw ratio of 1.0 for 2 second. The gas flux of the hollow fibers thus-obtained for oxygen, nitrogen and hydrogen was measured, and the results obtained are:

$Q(O_2) = 1.0 \times 10^{-6}$ (cm$^3$(STP)/cm$^2$·sec·cmHg)

$Q(N_2) = 1.6 \times 10^{-7}$ (cm$^3$(STP)/cm$^2$·sec·cmHg)

$Q(H_2) = 9.0 \times 10^{-6}$ (cm$^3$(STP)/cm$^2$·sec·cmHg)

EXAMPLE 10

Poly(vinylidene fluoride) (density: 1.765; Tg=−35° C.; Tm=185° C.; melt viscosity at 250° C., 100 sec$^{-1}$: 10,000 poises) was spun from a torusoid nozzle of 4 mm in diameter at 250° C. at a take-up speed of 500 m/min and a draft ratio of 200, with cooling with air at 18° C. to obtain hollow fibers, which were continuously passed through a far-infrared stove at 150° C. with retention time of 1 second using a series of rolls to effect first annealing, and then the hollow fiber together with a bobbin on which the fiber was wound was left to stand in a heating furnace at 140° C. for 30 minutes to effect second annealing.

The hollow fibers were subjected to a series of treatments sequentially as described below.

(1) corona discharging at an intensity of 1.25 w-sec/cm$^2$, 2 times;

(2) dipping in a 0.3 wt. % solution in chloroform of poly-(methyl methacrylate), 2 times, and drying at 50° C., 2 times;

(3) cold drawing at 0° C. and at a draw ratio of 1.2; and (4) hot drawing at 120° C. at a draw ratio of 1.5;

(5) heat setting at 150° C. and at a draw ratio of 0.85, with retention time being 0.5 second.

The gas flux of the hollow fibers thus-obtained for oxygen and nitrogen was measured, and the results obtained are:

$Q(O_2) = 3.0 \times 10^{-6}$ (cm$^3$(STP)/cm$^2$·sec·cmHg)

$Q(N_2) = 5.2 \times 10^{-7}$ (cm$^3$(STP)/cm$^2$·sec·cmHg)

$\alpha(O_2/N_2) = 5.8$

As demonstrated in the examples described above, the method of this invention can provide composite membranes which have an ultra-thin active layer and which are free of pinholes the removal of which has heretofore been difficult because the conventional methods for the production of heterogeneous membranes by coating porous membranes fail to attain both the requirements. Therefore, this invention enables production of polymer membranes for separation of fluids which have high separation coefficient and high gas flux and provide polymer membranes having excellent performance of separating gases and organic liquids. While required characteristics of membrane (for example, gas flux, separation coefficient, pressure resistance, heat resistance, corrosion resistance, etc.) may vary depending on the purposes for which it is used or on the objective system to which it is applied, the method of producing composite membranes for use in gas separation according to this invention is advantageous in that the hollow fibers or flat films comprised by crystalline polymer which serves as a support and the coating substance which serves as separate active layer can be chosen relatively freely and independently of each other, design and production of composite membranes suited for the objective are facilitated.

Having now fully described this invention, it will be apparent to those of skill in the art that the same can be performed with in a wide and equivalent range of parameters, structures and compositions without affecting the spirit or scope of the invention or any embodiment thereof.

What is claimed is:

1. A method for producing a gas separation membrane comprising a microporous support having provided thereon a non-porous coating layer, comprising:

(1) melt-extruding a thermoplastic crystalline polymer under the conditions of a melt-extrusion temperature, $T_{EX}$, which is between Tm°C. and (Tm+100)°C. where Tm designates the crystalline melting point of the polymer and a draft ratio, Df, satisfying the relationship:

$5 \leq Df \leq 10,000$ to form a precursor in the form of a hollow fiber or flat film;

(2) coating said precursor as a support with a coating substance composed of a natural or synthetic substance capable of forming a polymeric layer which layer does not form pinholes upon subsequent drawing process after solidification to form a coating layer on the surface of said support;

(3) solidifying said coating layer;

(4) annealing said support at an annealing temperature, $T_{AN}$, which is between $(Tg+20)°C$ and $(Tm-5)°C$ where Tg indicates the glass transition temperature of said support and Tm has the same meaning as defined above;
   (a) after said coating process (2) above, or
   (b) prior to said coating process (2) above;
(5) cold drawing the thus-treated support with said coating layer at cold drawing temperature, $T_{CD}$, which is between $(Tg-50)°C$ and $(Tm-10)°C$ where Tg and Tm have the same meanings as defined above; and
(6) heat-setting said support with said coating layer at a heat-setting temperature, $T_{HS}$, which is between (the drawing temperature used in the step (5) above $+10)°C$ and $Tm°C$ where Tm has the same meaning as defined above to form micropores only in said support;

thus forming a composite membrane comprising a microporous support having laminated thereon a non-porous coating layer.

2. The method as claimed in claim 1, wherein said draft ratio is 50 to 10,000.

3. The method as claimed in claim 1, wherein said crystalline polymer is a thermoplastic crystalline polymer having an achievable crystallinity of not lower than 20%.

4. The method as claimed in claim 3, wherein said thermoplastic crystalline polymer is selected from the group consisting of polyolefins, vinyl polymers, fluorine-containing polymers, polyamides, polyesters, polycarbonates, polyethers, polythioethers, polyphenylene chalcogenides and polyether ether ketones, and blends and copolymers thereof.

5. The method as claimed in claim 4, wherein said thermoplastic crystalline polymer is selected from the group consisting of polypropylene, polyethylene, poly-4-methylpentene-1 and polyoxymethylene, and blends and copolymers thereof.

6. The method as claimed in claim 1, wherein said crystalline polymer contains at least one additive selected from the group consisting of anti-oxidants, antistatic agents, fungicides, lubricants and surfactants.

7. The method as claimed in claim 1, wherein said melt-extruding is carried out at a temperature between $(Tm+10)°C$ and $(Tm+50)°C$.

8. The method as claimed in claim 1, wherein said precursor has a wall thickness of 1 to 1,000 $\mu m$.

9. The method as claimed in claim 1, wherein said precursor is in the form of a hollow fiber.

10. The method as claimed in claim 9, wherein said hollow fiber has an outer diameter of 5 to 5,000 $\mu m$.

11. The method as claimed in claim 9, wherein said hollow fiber has an outer diameter of 20 to 500 $\mu m$.

12. The method as claimed in claim 11, wherein said hollow fiber has a wall thickness of 1 to 50 $\mu m$.

13. The method as claimed in claim 1, wherein said coating substance is a polymer capable of forming films after coating and drying, or a polymerizable monomer capable of forming films after coating by the action of heat, light or radiation.

14. The method as claimed in claim 1, wherein said coating substance contains at least one additive selected from the group consisting of a surfactant, an anti-oxidant, an antistatic agent, a plasticizer, an ultraviolet ray absorbent and a coloring agent.

15. The method as claimed in claim 1, wherein said coating substance is coated in the form of a coating solution.

16. The method as claimed in claim 16, wherein said coating solution contains a high boiling point solvent.

17. The method as claimed in claim 1, wherein said coating layer has a mean thickness of about 0.001 to 50 $\mu m$.

18. The method as claimed in claim 17, wherein said coating layer has a mean thickness of about 0.001 to 1 $\mu m$.

19. The method as claimed in claim 18, wherein said coating layer has a mean thickness of about 0.001 to 0.5 $\mu m$.

20. The method as claimed in claim 15, wherein said coating solution comprises a substantially non-solvent to said thermoplastic crystalline polymer.

21. The method as claimed in claim 15, wherein said coating solution has a viscosity of 0.1 to 500 centipoises at the coating temperature.

22. The method as claimed in claim 21, wherein said coating solution has a viscosity of 0.5 to 50 centipoises at the coating temperature.

23. The method as claimed in claim 15, wherein said coating solution contains said polymer in a concentration of 0.01 to 10 wt. % based on the total weight of said coating solution.

24. The method as claimed in claim 23, wherein said coating solution contains said polymer in a concentration of 0.05 to 2 wt. % based on the total weight of said coating solution.

25. The method as claimed in claim 1, wherein said method further comprises pretreating said precursor prior to said coating, said pretreatment being at least one operation selected from the group consisting of corona discharge treatment, plasma treatment, treatment with an acid or alkali, and coating with a surfactant.

26. The method as claimed in claim 25, wherein said support is composed of a polyolefin or a fluorine-containing polymer.

27. The method as claimed in claim 1, wherein said method further comprises hot drawing said precursor having been subjected to said cold drawing at a temperature above the temperature of said cold drawing but not higher then Tm.

28. The method as claimed in claim 27, wherein total draw ratio after said cold drawing and said hot drawing is 1.1 to 5.0.

29. The method as claimed in claim 1, wherein said cold drawing is performed at a drawing speed of 1 to 10,000 %/sec.

30. The method as claimed in claim 1, wherein said heat setting is carried out for at least 1 second.

31. The method as claimed in claim 1, wherein said heat setting is carried out at draw ratio of 0.9 to 2.0.

32. The method as claimed in claim 1, wherein said coating step (2) is performed prior to said annealing process (4).

33. The method as claimed in claim 32, wherein said solidification step (3) is performed simultaneously with said annealing step (4).

34. The method as claimed in claim 32, further comprising pretreating said precursor prior to said coating, said pretreatment being at least one operation selected from the group consisting of corona discharge treatment, plasma treatment with an acid or alkali, and coating with a surfactant.

35. The method as claimed in claim 33, further comprising hot drawing said precursor having been subjected to said cold drawing at a hot drawing temperature, $T_{HD}$, which is above said cold drawing temperature, $T_{CD}$, but not higher than Tm.

36. The method as claimed in claim 1, wherein said coating step (2) is performed after said annealing step (4).

37. The method as claimed in claim 36, wherein said solidification step (3) is performed simultaneously with said cold drawing step (5).

38. The method as claimed in claim 37, further comprising pretreating said precursor prior to said coating, said pretreatment being at least one operation selected from the group consisting of corona discharge treatment, plasma treatment, treatment with an acid or alkali, and coating with a surfactant.

39. The method as claimed in claim 36, wherein said solidification step (3) is performed between said cold drawing step (5) and said heat-setting step (6).

40. The method as claimed in claim 39, further comprising hot drawing said precursor having been subjected to said cold drawing at a hot drawing temperature, $T_{HD}$, which is above said cold drawing temperature, $T_{CD}$, but not higher than Tm.

41. The method as claimed in claim 39, further comprising pretreating said precursor prior to said coating, said pretreatment being at least one operation selected from the group consisting of corona discharge treatment, plasma treatment, treatment with an acid or alkali, and coating with a surfactant.

42. The method as claimed in claim 36, wherein said solidification step (3) is performed after said cold drawing step (4).

43. The method as claimed in claim 42, further comprising pretreating said precursor prior to said coating, said pretreatment being at least one operation selected from the group consisting of corona discharge, plasma treatment, treatment with an acid or alkali, and coating with a surfactant.

44. The method as claimed in claim 1, wherein said coating operation is at least one operation selected from the group consisting of spraying, coating using a brush or coating bar, and dipping.

45. The method as claimed in claim 1, wherein said coating layer is provided on only one surface of said support.

46. The method as claimed in claim 45, wherein said only one surface of said support is the surface of said support on the side with which a fluid to be separated will be brought into contact in a gas separation operation.

47. The method as claimed in claim 1, wherein said coating layer comprises at least two unit layers.

48. The method as claimed in claim 1, wherein said unit layers are composed of different substances.

49. A method for producing a gas separation membrane comprising a microporous support having provided thereon a non-porous coating layer, comprising:
(1) melt-extruding a polyolefin thermoplastic crystalline polymer under the conditions of a melt-extrusion temperature, $T_{EX}$, which is between Tm°C. and (Tm+100)°C. where Tm designates the crystalline melting point of the polyolefin and a draft ratio, Df, satisfying the relationship:

$$5 \leq Df \leq 10,000$$

to form a precursor in the form of a hollow fiber or flat film;
(2) coating said precursor as a support with a coating substance composed of a natural or synthetic substance capable of forming a polymeric layer which layer does not form pinholes upon subsequent drawing process after solidification to form a coating layer on the surface of said support;
(3) solidifying said coating layer;
(4) cold drawing the thus-treated support with said coating layer at a cold drawing temperature, $T_{CD}$, which is between (Tg−50)°C. and (Tm−10)°C. where Tg is the glass transition temperature of said support and Tm has the same meaning as defined above; and
(5) heat-setting said support with said coating layer at a heat-setting temperature, $T_{HS}$, which is between (the drawing temperature used in the step (4) above +10)°C. and Tm°C. where Tm has the same meaning as defined above to form micropores only in said support; thus forming a composite membrane comprising a microporous support having laminated thereon a non-porous coating layer.

50. The method as claimed in claim 49, further comprising pretreating said precursor prior to said coating, said pretreatment being at least one operation selected from the group consisting of corona discharge treatment, plasma treatment, treatment with an acid or alkali, and coating with a surfactant.

51. The method as claimed in claim 49, further comprising hot drawing said precursor having been subjected to said cold drawing at a hot drawing temperature, $T_{HD}$, which is above said cold drawing temperature, $T_{CD}$, but not higher than Tm.

52. The method as claimed in claim 49, wherein said solidification step (3) is performed between said cold drawing step (4) and said heat-setting step (5).

53. The method as claimed in claim 52, further comprising hot drawing said precursor having been subjected to said cold drawing at a hot drawing temperature, $T_{HD}$, which is above said cold drawing temperature, $T_{CD}$, but not higher then Tm.

54. The method as claimed in claim 52, further comprising pretreating said precursor prior to said coating, said pretreatment being at least one operation selected from the group consisting of corona discharge treatment, plasma treatment, treatment with an acid or alkali, and coating with a surfactant.

55. The method as claimed in claim 49, wherein said coating operation is at least one operation selected from the group consisting of spraying, coating, using a brush or coating bar, and dipping.

56. The method as claimed in claim 49, wherein said coating layer is provided on only one surface of said support.

57. The method as claimed in claim 56, wherein said only one surface of said support is the surface of said support on the side with which a fluid to be separated will be brought in contact in gas separation operation.

58. The method as claimed in claim 49, wherein said coating layer comprises at least two unit layers.

59. The method as claimed in claim 49, wherein said unit layers are composed of different substances.

60. The method as claimed in claim 49, further comprising: (6) annealing said support at an annealing temperature, $T_{AN}$, which is between (Tg+20)°C. and (Tm−5)°C. where Tg indicates the glass transition temperature of said support and Tm has the same meaning as defined above.

61. The method as claimed in claim 60, wherein said solidification step (3) is performed simultaneously with said annealing step (6).

62. The method as claimed in claim 60, wherein said coating step (2) is performed after said annealing step (6).

63. The method as claimed in claim 62, wherein said solidification step (3) is performed simultaneously with said cold drawing step (5).

64. The method as claimed in claim 63, further comprising pretreating said precursor prior to said coating, said pretreatment being at least one operation selected from the group consisting of corona discharge treatment, plasma treatment, treatment with an acid or alkali, and coating with a surfactant.

65. The method as claimed in claim 62, wherein said solidification step (3) is performed between said cold drawing step (5) and said heat-setting step (6).

66. The method as claimed in claim 65, further comprising hot drawing said precursor having been subjected to said cold drawing at a hot drawing temperature, $T_{HD}$, which is above said cold drawing temperature, $T_{cd}$, but not higher than Tm.

67. The method as claimed in claim 65, further comprising pretreating said precursor prior to said coating, said pretreatment being at least one operation selected from the group consisting of corona discharge treatment, plasma treatment, treatment with an acid or alkali, and coating with a surfactant.

68. The method as claimed in claim 62, wherein said solidification step (3) is performed after said cold drawing step (4).

69. The method as claimed in claim 68, further comprising pretreating said precursor prior to said coating, said pretreatment being at least one operation selected from the group consisting of corona discharge treatment, plasma treatment, treatment with an acid or alkalli, and coating with a surfactant.

70. The method as claimed in claim 49, wherein said draft ratio is 50 to 10,000.

71. The method as claimed in claim 49, wherein said crystalline polymer contains at least one additive selected from the group consisting of anti-oxidants, anti-static agents, fungicides, lubricants and surfactants.

72. The method as claimed in claim 49, wherein said melt-extruding is carried out at a temperature between (Tm +10)°C. and (Tm +50)°C.

73. The method as claimed in claim 47, wherein said precursor has a wall thickness of 1 to 1,000 μm.

74. The method as claimed in claim 49, wherein said precursor is in the form of a hollow fiber.

75. The method as claimed in claim 74, wherein said hollow fiber has an outer diameter of 5 to 5,000 μm.

76. The method as claimed in claim 49, wherein said coating substance is a polymer capable of forming films after coating and drying, or a polymerizable monomer capable of forming films after coating by the action of heat, light or radiation.

77. The method as claimed in claim 49, wherein said coating substance contains at least one additive selected from the group consisting of a surfactant, an anti-oxidant, an anti-static agent, a plasticizer, an ultraviolet ray absorbent and a coloring agent.

78. The method as claimed in claim 49, wherein said coating substance is coated in the form of a solution.

79. The method as claimed in claim 78, wherein said coating solution contains a high boiling point solvent.

80. The method as claimed in claim 49, wherein said coating layer has a mean thickness of about 0.001 to 50 μm.

81. The method as claimed in claim 79, wherein said coating solution comprises a non-solvent.

82. The method as claimed in claim 78, wherein said coating solution has a viscosity of 0.1 to 500 centipoises at the coating temperature.

83. The method as claimed in claim 78, wherein said coating solution contains said polymer in a concentration of 0.01 to 10 wt. % based on the total weight of said coating solution.

84. The method as claimed in claim 49, wherein total draw ratio after said cold drawing and said hot drawing is 1.1 to 5.0.

85. The method as claimed in claim 49, wherein said drawing is performed at a drawing speed of 1 to 10,000%/sec.

86. The method as claimed in claim 49, wherein said heat setting is carried out for at least 1 second.

87. The method as claimed in claim 49, wherein said heat setting is carried out at draw ratio of 0.9 to 2.0.

* * * * *